United States Patent

[11] 3,554,389

| [72] | Inventor | Thomas John Robert Bright |
| | | 270 Sandridge Road, Rockcliffe Park, |
| | | Ottawa, Ontario, Calif. |
| [21] | Appl. No. | 718,049 |
| [22] | Filed | Apr. 2, 1968 |
| [45] | Patented | Jan. 12, 1971 |
| [32] | Priority | Apr. 5, 1967 |
| [33] | | Great Britain |
| [31] | | 15723/67 |

[54] MECHANIZED STORAGE SYSTEMS AND APPARATUS THEREFOR
14 Claims, 13 Drawing Figs.

| [52] | U.S. Cl. | 214/16.1 |
| [51] | Int. Cl. | E04h 6/06 |
| [50] | Field of Search | 214/16.14, 16.14(C-D), 16.1 |

[56] References Cited
UNITED STATES PATENTS

| 1,326,949 | 1/1920 | Meehan | 214/16.1(4-D) |
| 2,652,162 | 8/1953 | Auger | 214/16.1(4-D) |
| 2,830,715 | 4/1958 | Oholm | 214/18 |
| 3,390,791 | 7/1968 | Baldwin et al. | 214/16.1(4-C) |

*Primary Examiner*—Gerald M. Forlenza
*Assistant Examiner*—Raymond B. Johnson
*Attorney*—Arthur B. Colvin

ABSTRACT: A vehicle storage and retrieval system including a plurality of storage unit each having N storage locations within a rectangular area accessible from at least one vehicle transporting route ($a_1$, $a_2$,) N-3 pallets (1 to 5), two pallet carriers (a,b,) and two locations (c,d,) devoid of pallets (1 to 5), or carriers, (a,b,) the pallets arranged in two parallel rows for sequential step-by-step circulation about the area and the carriers being reciprocable between rows, the transfer of vehicles mounted on the pallets to or from a transporting route being effected by reciprocatory movement of the carriers and circulatory movement of the pallets around the area.

FIG.6.

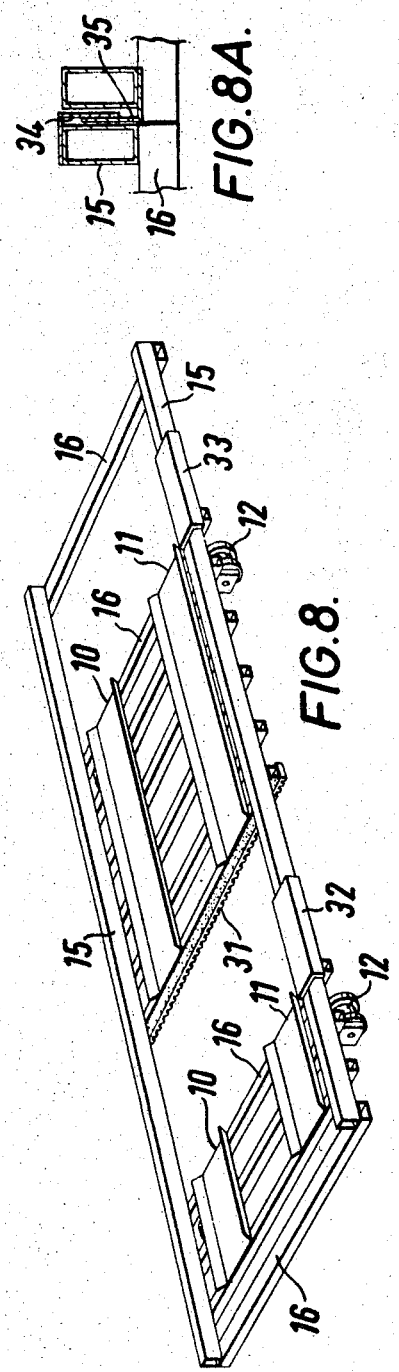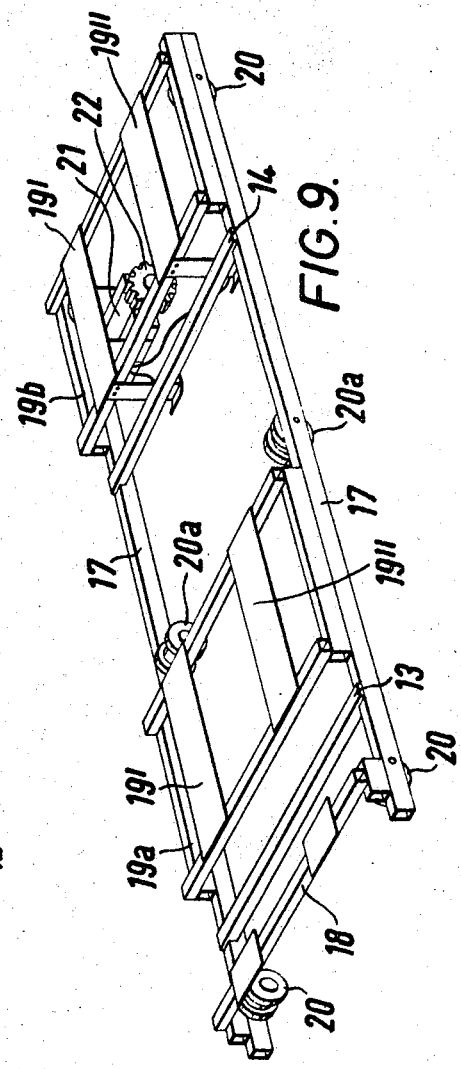

FIG.12.

MECHANIZED STORAGE SYSTEMS AND APPARATUS THEREFOR

This invention relates to a mechanized storage system and apparatus therefor and particularly, but not exclusively to a storage and retrieval system and apparatus for vehicles, although the invention is equally applicable to the storage of all kinds of goods such as merchandise, in warehouses and other structures.

The present invention is concerned with a load storage and retrieval system of the kind in which a plurality of load carrying movable platforms each arranged to carry at least one article to be stored, are juxtaposed within a rectangular track in at least two parallel rows, and arranged to circulate or be shifted around the track in a sequential, step-by-step manner in order to render each platform available for the reception, eventual storage and subsequent retrieval of said at least one article.

In such storage and retrieval systems for the storage of vehicles, it is desirable that a vehicle be dispatched from a reception point to a particular storage location with the minimum of delay and similarly, that when required, a vehicle is removed from the particular storage location and dispatched to an exit point in the minimum time period possible.

Thus, an object of the present invention is to provide a mechanized load storage and retrieval system wherein objects to be stored, such as vehicles, are placed in a storage location or removed therefrom with the minimum delay and with a minimum amount of circulation or movement of the movable platforms provided for the support and conveyance of the objects.

A further object of the present invention is to provide a mechanized load storage and retrieval system wherein objects to be stored, such as vehicles, are circulated in accordance with a predetermined rhythm thereby allowing the movement of the objects to be controlled by computerization techniques.

According to one aspect of the present invention there is provided a load storage system and apparatus therefor comprising at least one load storage unit, the or each unit having N storage locations formed within a rectangular area accessible from at least one load transporting route, and N−3 movable load supporting members, said area containing in addition two movable carrier members and two locations devoid of load supporting members or carrier members, said load supporting members being arranged in two parallel rows and such as to be capable of circulation in a step-by-step sequential manner around the rectangular area and movable in a direction parallel to one axis of the unit and movable in a direction normal to said axis on a carrier member, each of which are reciprocatable along a respective track extending in a direction normal to said one axis at each end of the rectangular area, so as to be aligned alternately with said parallel rows of load supporting members, the arrangement being such that the transfer of a load carried by any load supporting member, to or from said at least one load transporting route, respectively from or to a selected storage location is effected by circulatory movement of the load supporting members in conjunction with reciprocatory movement of the carrier members.

In a preferred embodiment of the invention applicable to the storage and retrieval from storage of motor vehicles, each storage unit comprises two parallel rows of vehicle storage locations located within a rectangular area containing two carrier members for effecting transverse movement of vehicle supporting platforms or pallets within the area, two spaces devoid of pallets or carrier members to allow the carrier members to be shuttled or reciprocated from one parallel row to the other such as to be aligned alternately with each row, and an odd number, preferably five pallets, being provided, one row containing one more pallet than the other row and one or other of the two carriers always supporting one of the pallets. Each carrier is capable of reciprocatory movement along a track defined between stationary guides or rails supporting all but one of the pallets, and the ends of the rectangular storage area. Preferably each storage unit is located between and served by two spaced, parallel vehicle transporting routes or expressways, each containing an express carrier member. Thus, the retrieval of a vehicle from a particular storage location of a unit, or the introduction of a vehicle into a selected vacant storage location, is effected by the sequential shifting the the pallets—along the longitudinal axis of the unit by means of the stationary guides or rails, and in a lateral or transverse direction normal to the longitudinal axis, by means of the reciprocable shuttle carrier members, such that a vehicle can be moved from an express carrier member to an adjacent storage unit carrier member or vice versa, with the minimum amount of delay and circulatory movement.

In a further embodiment of the invention, the pallets are provided with coupling means to allow the pallets to move in coupled relationship as a train, in say a longitudinal direction, whilst allowing the pallets to become uncoupled and discrete integers when movement is required, for instance, in a lateral or transverse direction on the shuttle or expressway carriers.

In a still further embodiment of the invention, motivating means for the pallets and carriers are arranged to be controlled by electrical command signals derived from data processing means, in response to the sensing of data recorded on a record media such as a vehicle parking ticket, whereby the system of storage and retrieval of the vehicles is entirely automated.

Although the invention is applicable to load storage and handling systems generally, a preferred embodiment of the invention will be described with particular reference to a vehicle storage and retrieval system and apparatus therefor and such a system and apparatus will now be described by way of example only with particular reference to the accompanying drawings wherein:

FIG. 6 is a schematic diagram similar to that of FIG. 1 showing a single level layout for 42 storage units, all of which are shown with a full complement of five pallets and two shuttle carriers, and showing various sequences of operation for each unit;

FIG. 8 is a perspective view of a preferred form of pallet for use in the system of the invention;

FIG. 8A is a fragmentary section of two pallets showing a form of coupling the pallets together;

FIG. 9 is a perspective view of a carrier for use in an expressway or within the rectangular area of a storage unit;

FIG. 12 is a diagram of a system employing 14 storage units located between two expressways, each unit containing 53 pallets and the system being particularly useful for merchandise handling and storage purposes.

Figure 1:
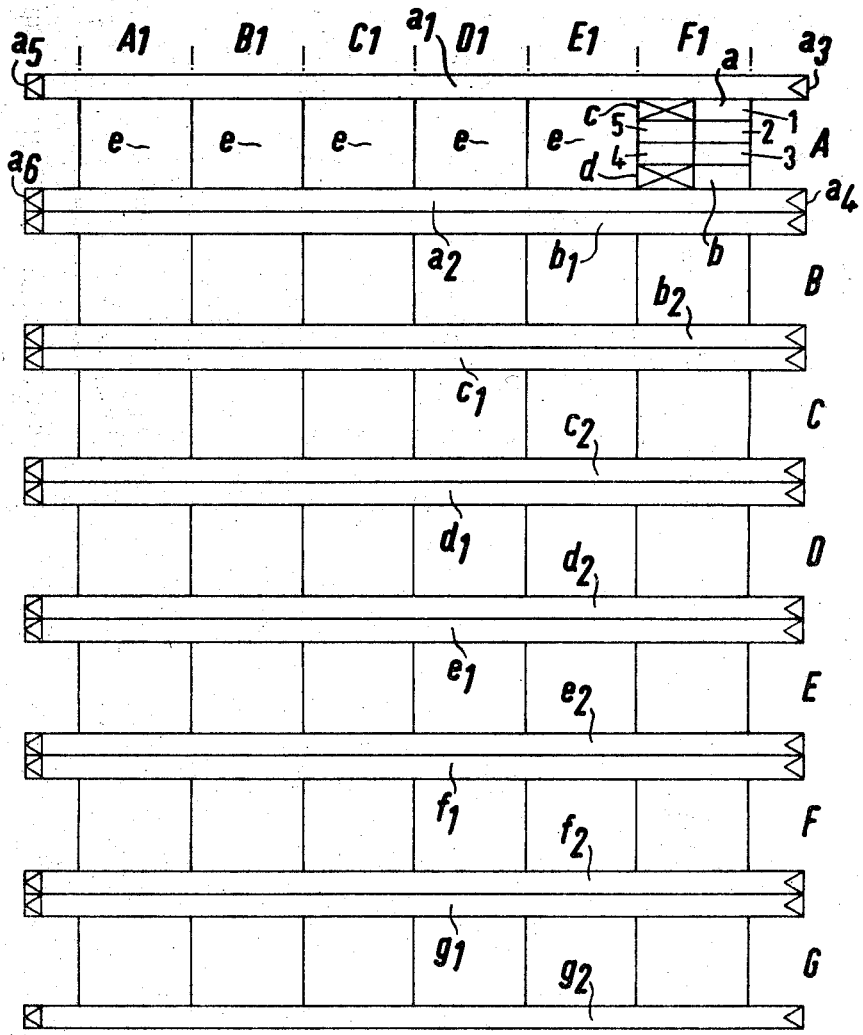
FIG. 1 is a schematic diagram showing a single level vehicle storage system employing 42 storage units each capable of storing five vehicles on their respective pallets and provided with 14 entry and exit points and a corresponding number of vehicle transporting routes connecting the respective entry and exit points and hereinafter termed expressways.

In the vehicle system shown in FIG. 1, seven rows of storage units A to G are provided, each row containing six storage units $A_1$ to $F_1$ and each storage unit, as shown for storage unit $F_1$ of row A, including eight storage locations, five of which contain pallets 1 to 5, two of which contain shuttle carrier members $a$, $b$, and two of which are devoid of both pallets and shuttle carrier members as shown at $c$, $d$, for a purpose hereinafter defined.

Figure 2:
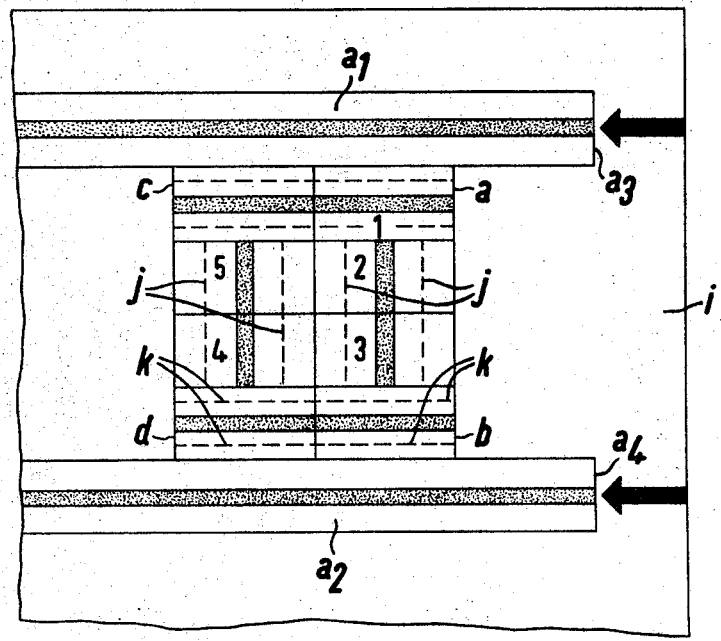
FIG. 2 is a diagrammatic representation of a single storage unit showing the direction of movement of the carriers and pallets.
Figure 3:
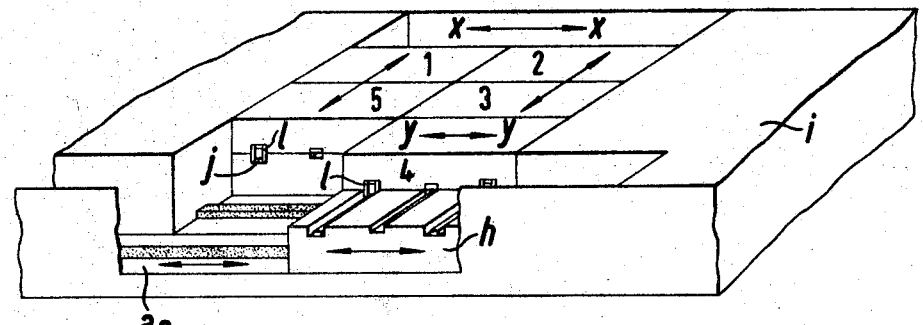
FIG. 3 is a diagrammatic perspective view showing the manner in which the pallets and shuttle carriers are arranged within the rectangular track.

As shown more clearly in FIGS. 2 and 3, each storage unit is capable of storing five vehicles, each vehicle (not shown) being mounted on a flat platform or pallet 1 to 5. Thus, each storage unit has eight storage locations, two of which contain pallet shuttle carriers $a$, $b$, leaving the two blank spaces in each unit for circulation of the pallets 1 to 5 around the rectangular track $e$; one of the shuttle carriers $b$ being shown without a pallet thereon and the other shuttle carrier $a$ being shown in FIGS. 1 and 2 with pallet No. 1 mounted thereon. Thus, each storage unit of the storage system has N−3 pallets for the conveyance and storage of vehicles, where N is the number of storage locations in each unit. In the example shown in FIG. 2, $N = 8$.

Each storage unit e.g. F1/A (FIG. 1) is located between two vehicle transporting routes or expressways e.g. $a_1$, $a_2$ for the row A, having input and exit points $a_3$, $a_4$; $a_5$, $a_6$; respectively. The expressways, $a_1$, $a_2$, allow vehicles to be removed from storage or placed into any of storage units $A_1$ to $F_1$ of row A from either side of the respective storage unit. Similarly two expressways $b_1$, $b_2$; $c_1$, $c_2$; $d_1$, $d_2$; $e_1$, $e_2$; $f_1$, $f_2$; $g_1$, $g_2$; serve the six storage units of each of rows B to G respectively.

The pallet shuttle carriers $a$, $b$, are free to move backwards and forwards in a transverse direction only i.e. in the direction of the arrows x–x and y–y in FIG. 3. The pallet carriers $a$, $b$, are always located in one of the storage locations adjacent the respective expressways, e.g. $a_1$, $a_2$, (FIGS. 1 and 2) and both shuttle carriers $a$, $b$, move in the same direction simultaneously. An additional carrier member e.g. $h$ (FIG. 3) is located in each expressway. The carrier members $a$, $b$, and the express carriers $h$ are located below the level of the floor area $i$ by a depth substantially equivalent to the height of a pallet, whilst the pallets 2 to 5 inclusive of FIGS. 2 and 3 are arranged to run on static slideways, guides or rails $j$ corresponding in height to the depth of the carriers $a$, $b$, such that the pallets are all located at the same height whether they are located on rails $j$ or on the guideways of a carrier $a$, $b$, and the pallets 1 to 5 are all substantially level with the drive-on surface $i$.

Before describing the constructional features of the various individual integers and components of the system, the sequential movement of the carriers $a$, $b$, and pallets 1 to 5 will be described with particular reference to FIGS. 3 and 4, to illustrate the manner in which a vehicle arriving at a reception point e.g. $a_3$ (FIGS. 1 or 2), is stored in a particular storage location, and how a vehicle can be moved from a storage location of a storage unit on to one or other of the expressways adjacent each row of storage units.

At the reception end e.g. $a_3$, $a_4$, of row A of expressways $a_1$, $a_2$, respectively, a carrier $h$ (FIG. 3) with a pallet located thereon, is always available. Thus, as shown in FIG. 3, a carrier $h$ is located on the expressway $a_2$. When a pallet is located thereon a vehicle can be driven on to the pallet from the drive-on portion $i$, when the carrier and pallet have been moved to the reception end $a_4$ of the expressway. As soon as the vehicle is in position on the pallet, it is conveyed by means of the express carrier $h$ to a position opposite one or other row of a particular storage unit e.g. F1/A, and from thence, the vehicle is transferred by means of the carriers $a$, $b$, within the storage unit, to a particular storage location thereof.

Figure 4:
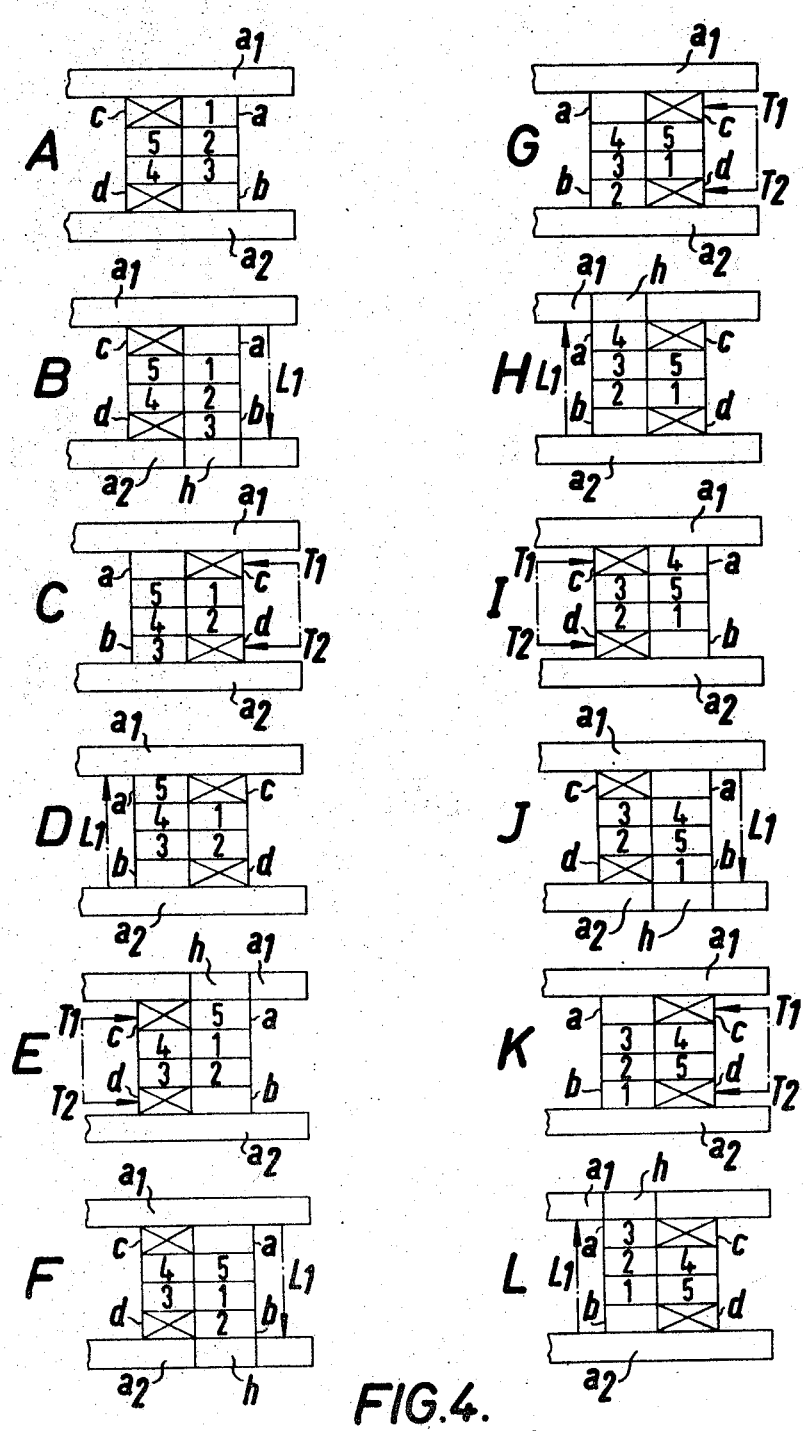
FIG. 4 is a composite series of diagrams 4A to 4U illustrating the detailed, sequential, step-by-step movement of pallets around the track and the reciprocatory movement of the two shuttle carriers of a single storage unit.
Figure 4:
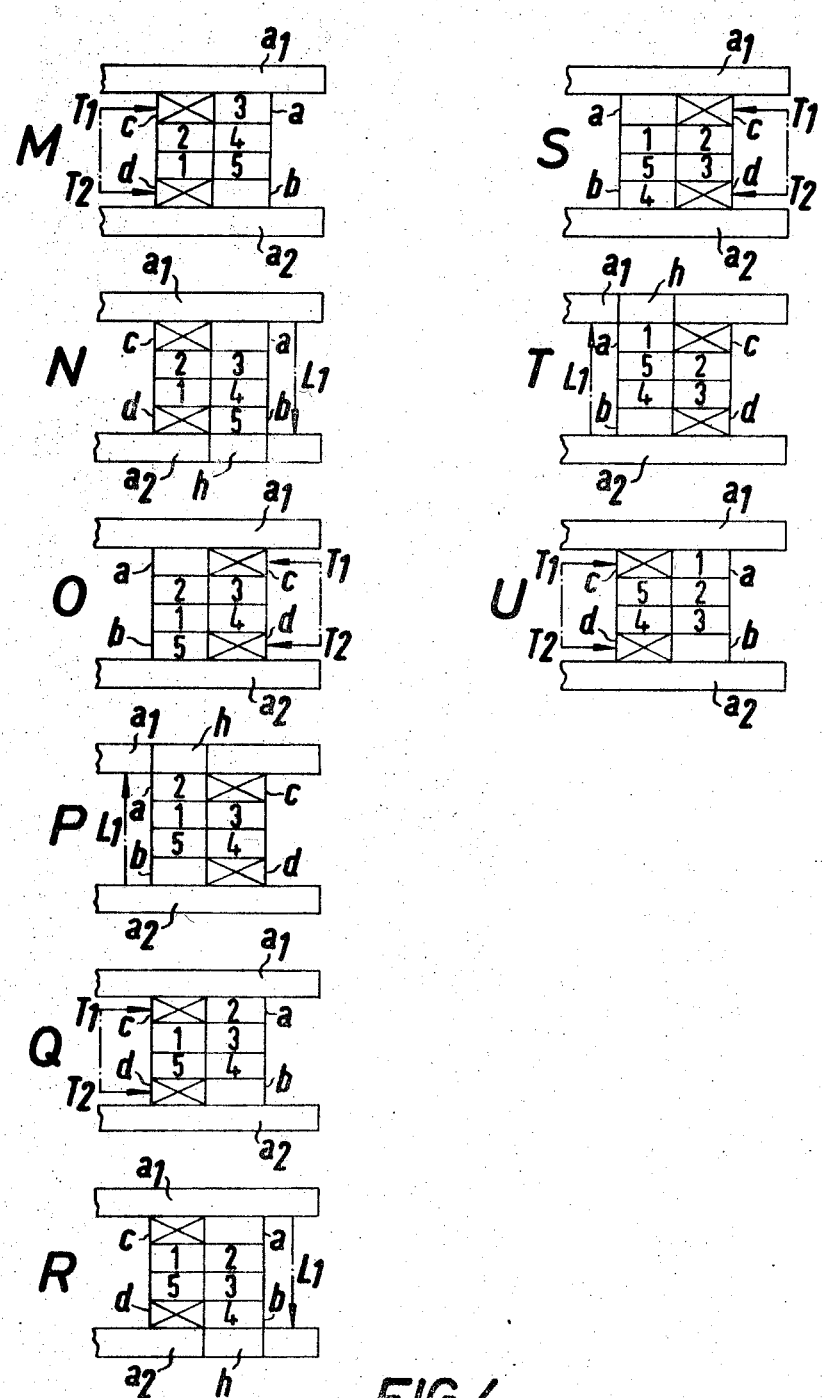
Figure 7:
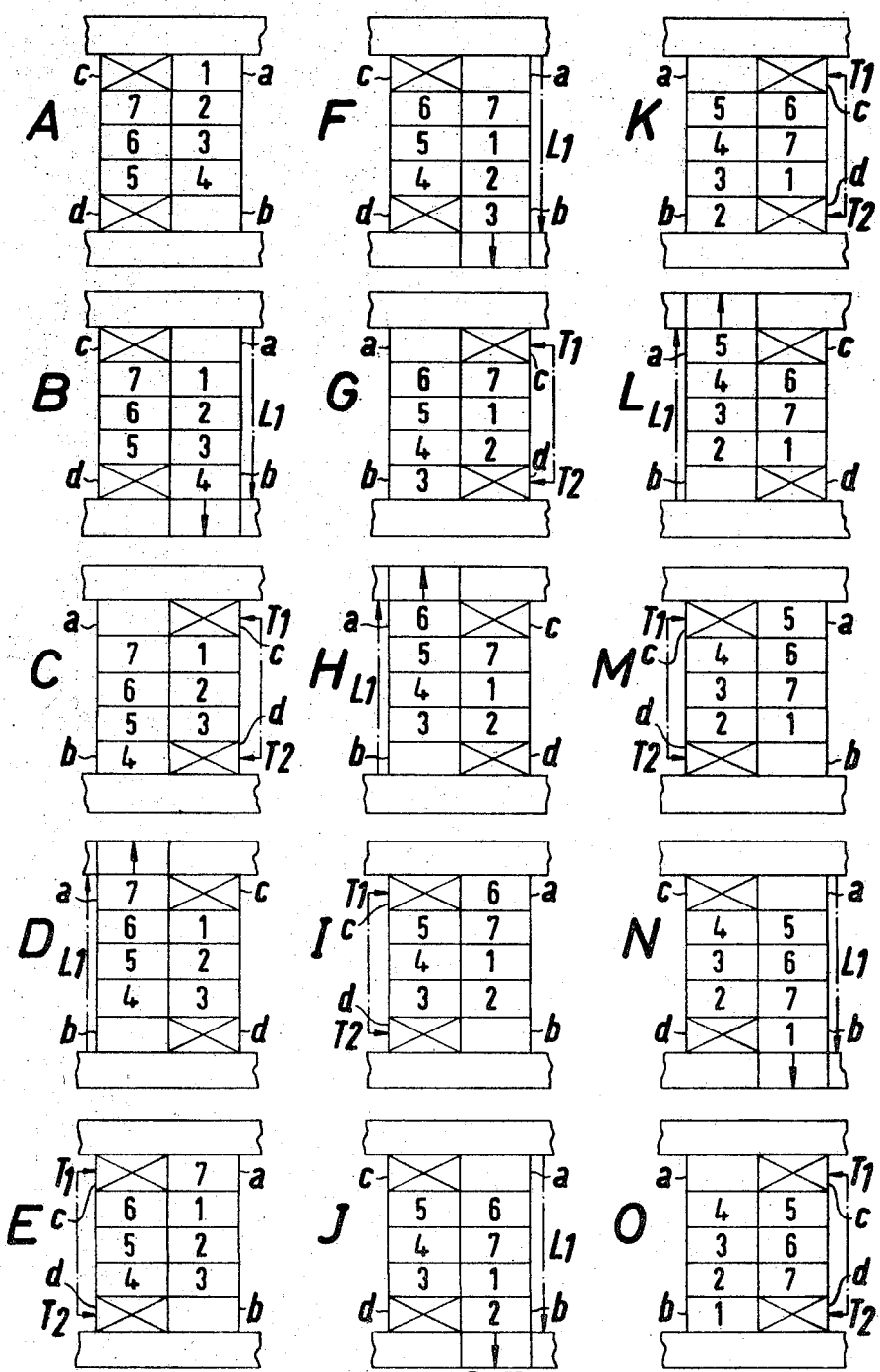
FIG. 7 is a schematic diagram of a storage system having 210 storage locations with seven storage pallets in each of 30 storage units arranged in five rows of six storage units in each row.
Figure 7:
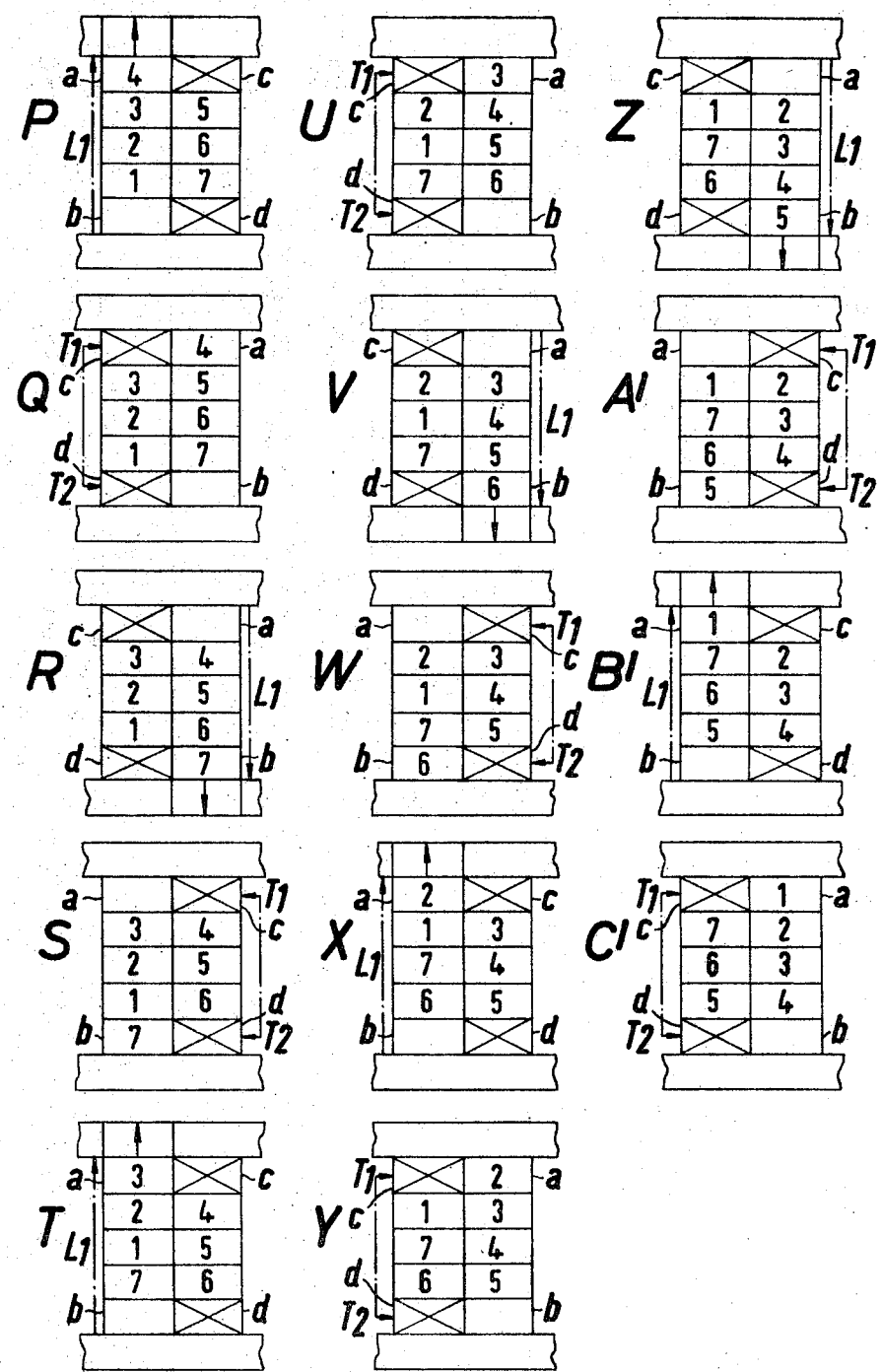

Referring now to FIG. 4, it will be assumed that it is required to shift the pallets and carriers of one storage unit through a complete cycle such that each pallet eventually arrives on a carrier adjacent a particular expressway and such that any vehicle mounted on a pallet may be retrieved from storage and dispatched via an expressway carrier and associated pallet, to an exit point. The pallets 1 to 5 are arranged initially in the order shown in diagram 4A and throughout each and every operation, the pallets will retain the same original sequential order. In diagram 4A, pallets 2 to 5 are mounted on the static guideways or rails $j$ by means of wheels or the like $l$, with pallet No. 1 mounted on carrier $a$ and carrier $b$ is without a pallet thereon. Throughout the diagrams 4A to 4U, the carriers are designated $a$ and $b$ and the blank spaces, whether they appear in the left-hand row or the right-hand row of the storage unit, are designated $c$ and $d$. The movement imparted to the pallets in a longitudinal direction is indicated by a single arrow $L_1$, and movement of the carriers and pallets in a transverse or lateral direction, is indicated by the double arrows $T_1$, $T_2$; the carriers $a$, $b$, always moving together in the same direction and thus always being in the same row at the same time.

In diagram 4A, pallet No. 1 is located on carrier (diagram a adjacent expressway $a_1$ and thus a vehicle may be removed from the storage unit by transferring pallet No. 1 from the carrier $a$ to a carrier $h$ on expressway $a_1$. Movement of the right-hand file in the direction of arrow $L_1$ (diagram 4B) causes pallet No. 1 to leave carrier $a$ and pallet No. 3 is located on pallet carrier $b$. If required, pallet No. 3 and any vehicle supported thereby, may be transferred to a carrier $h$ on expressway $a_2$. Transverse movement in the direction of arrows $T_1$, $T_2$, (diagram 4C) causes both carrier members $a$, $b$, to move from the right-hand row to the left-hand row; carrier $b$ carrying with it pallet No. 3 whilst carrier $a$ has no pallet thereon, and the blank spaces $c$, $d$, in the storage unit now appear in the right-hand row in those storage locations vacated by the carriers $a$, $b$, respectively. It will be seen from diagram 4D to 4U that alternate longitudinal and transverse movements of the pallets and carriers respectively, cause the pallets to circulate around the rectangular track of the storage unit such that each pallet is in turn positioned adjacent one or other expressway and may be removed therefrom on to an expressway carrier as required together with any vehicle supported thereon. Eventually, as shown in diagram 4U, after twenty alternate longitudinal and transverse movements the pallets and carriers appear in the original positions shown in diagram 4A.

Figure 6:
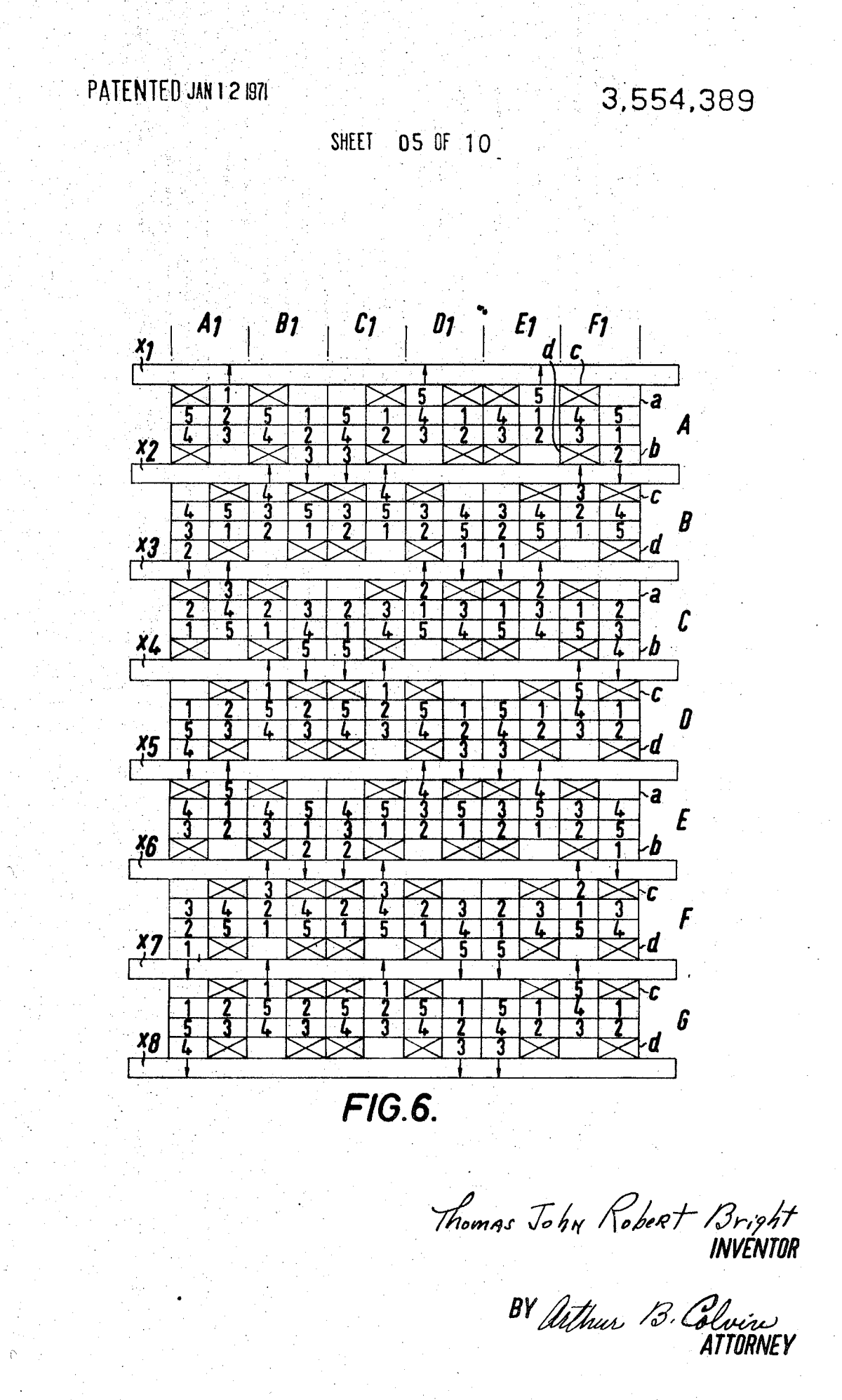

Referring to FIG. 6 which shows the five pallets 1 to 5 and two carriers $a$, $b$, for each of forty-two storage units, it will be seen that at every position of any storage unit, a pallet may be made available for transfer to an expressway carrier. Thus, taking the storage units $A_1$ to $F_1$ of row A, pallet No. 1 is available for transfer to expressway $x_1$ from storage unit $A_1$, pallet No. 3 is available for transfer to expressway $x_2$ from storage unit $B_1$, pallet No. 3 is also available for transfer to expressway $x_2$ from storage unit $C_1$, pallet No. 5 is available for transfer to expressway $x_1$ from unit $D_1$, pallet No. 5 is also available for transfer to expressway $x_1$ from unit $E_1$ and pallet No. 2 may be transferred to expressway $x_2$ from storage unit $F_1$. The availability of the pallets and the direction of movement thereof is indicated by the upwardly or downwardly pointing arrows in FIG. 6. Although each row of storage units e.g. A, is served by two expressways, it will be seen that for intermediate rows B to F, the expressways $x_2$ to $x_7$ are shared between adjacent rows of storage units.

The pallets 1 to 5 and carriers $a$, $b$, may be of any suitable construction. As shown in FIG. 8 the pallets are provided with a pair of spaced channels or tracks 10, 11 for receiving the wheels of a vehicle and for locating the vehicle symmetrically with respect to the pallet. The pallets are provided with wheels 12 preferably of bobbin or pulley construction and shown diagrammatically at 1 in FIG. 3, and arranged to run on rails 13, 14, on the shuttle carriers $a$, $b$, and on rails $j$ (FIGS. 3 and 11) within the rectangular storage unit track; the rails 13, 14 on the carriers (FIG. 9) being arranged such as to align with the rails $j$ when the shuttle carriers $a$, $b$, are located in alignment with either row of storage locations of a storage unit. The rails may be of any suitable cross section and may be formed from tubular rods.

The pallets 1 to 5 are of skeleton form to reduce the cost and weight of materials and comprise longitudinal and transverse members 15, 16, respectively of rectangular cross section as shown in FIG. 8. The shuttle carriers $a$, $b$ or the express carriers $h$ are of similar construction as shown in FIG. 9, having longitudinal and transverse members 17, 18, respectively and raised portions 19$a$, 19$b$, with tracks 19', 19" arranged to be located intermediate the channel portions 10, 11, when a pallet is mounted on a carrier $a$, $b$, or express carrier $h$, to allow vehicles to be driven on and off the pallets. The carrier $a$, $b$, and express carriers $h$ are of any suitable construction sufficient to support the pallets when loaded and, for carriers $a$, $b$, such as to be capable of relatively slow speed reciprocatory movement within a storage unit between the rows of storage locations, and capable for carriers $h$, of movement at high speed along the expressways $a_1$, $a_2$. As shown in FIG. 9, the carriers are of skeleton construction with a pair of wheels 20 preferably of bobbin construction, at each end thereof and a further pair 20$a$ intermediate the ends of the carrier, which has driving means 21 for effecting the reciprocatory movement of shuttle carriers $a$, $b$. For the shuttle carriers, a small electric motor 21 is mounted beneath platform 19$b$ and is arranged to drive a pinion 22 as will be hereinafter described. The express carriers $h$ are of similar construction and provided with an electric motor 23 (FIG. 11) arranged to drive a pinion (not shown), arranged to mesh with a rack 24 for effecting the high speed travel of the carriers $h$ along the expressways $a_1$, $a_2$. As previously indicated, both shuttle carriers $a$, $b$ move in the same direction simultaneously and racks 25, 26 are provided and arranged to mesh with pinions 22 provided on the shuttle carriers $a$, $b$.

Pallets 1 to 3 and 4 and 5 of FIGS. 1, 2, and 8, 10 and 11 are operated independently of one another by means of pinions 27, 28 driven by stationary electric motors 29, 30, respectively and arranged to mesh with the teeth of a rack 31 (FIG. 8) located on each pallet. In order to allow the pallets to move longitudinally as a train, coupling means 32, 33 are provided on the pallets 1 to 5 such that when a pallet is moved by the rack and pinion drive in a longitudinal direction, it will drag with it any pallet in a preceding storage location of the same row, but when lateral movement of the pallets is required by means of the shuttle carriers $a$, $b$, or the express carriers $h$ the coupling means 32, 33 allows the pallets in either row to become uncoupled to permit lateral movement of any pallet carried by the carriers $a$, $b$ or $h$ as required.

A preferred form of unidirectional coupling is shown in FIG. 8A wherein channels 34 are provided along one longitudinal edge of each pallet and channels 35 of complementary inverted form are provided along the opposite longitudinal edge of each pallet. Thus when the longitudinal edges carrying the complementary-shaped channel members 34, 35, of adjacent pallets are in juxtaposed relationship, the complementary-shaped channel members interlock to couple together the two adjacent pallets e.g. 2, 3 (FIG. 11) but such as to allow a pallet to become uncoupled from other pallets in the row by lateral movement from one row of storage locations, to the other, such as to become coupled to the pallets in the other row of storage locations. When a pallet moves on to an express carrier $h$, lateral movement of the express carrier $h$ along the expressway will uncouple the pallet from the others in the same row of storage locations.

It will be appreciated that the complementary-shaped channels 34, 35, may be provided along the lateral edges of the pallets if necessary, in order to couple the pallets in end-to-end fashion, but such as to allow the pallets to move longitudinally with respect to each other should such movement be required.

In order to prevent a pallet from overrunning a shuttle carrier $a$, $b$, thereby causing an obstruction to the free passage of an express carrier $h$ along an expressway, the shuttle carrier is provided with a pivoted stop member on the side thereof adjacent the expressway. The stop member may be of tapered or pear-shaped configuration and pivoted at the end having the larger surface area and provided with a pin or lug projecting from the end having the smaller surface area, towards the expressway. The stop member is arranged such that a part thereof is normally projecting above the shuttle carrier in the path of any pallet located thereon such as to prevent the pallet passing beyond the edge of the shuttle carrier. A tripping arrangement on the side of the express carrier adjacent the shuttle carrier is arranged to engage the lug on the shuttle carrier stop member such as to rotate the stop member out of the path of the pallet thereon, when a pallet is required to be transferred from a shuttle carrier to an express carrier, and vice versa. The tripping arrangement on the express carrier may comprise a camming slot formed in the side of the express carrier and arranged such that the lug on the shuttle carrier stop-member engages in the camming slot, which has a profile such as to rotate the stop member about the pivot as described. However, any form of pallet stop member and stop member tripping means may be provided in order to prevent the pallet overrunning the sides of the shuttle carrier.

Figure 11:
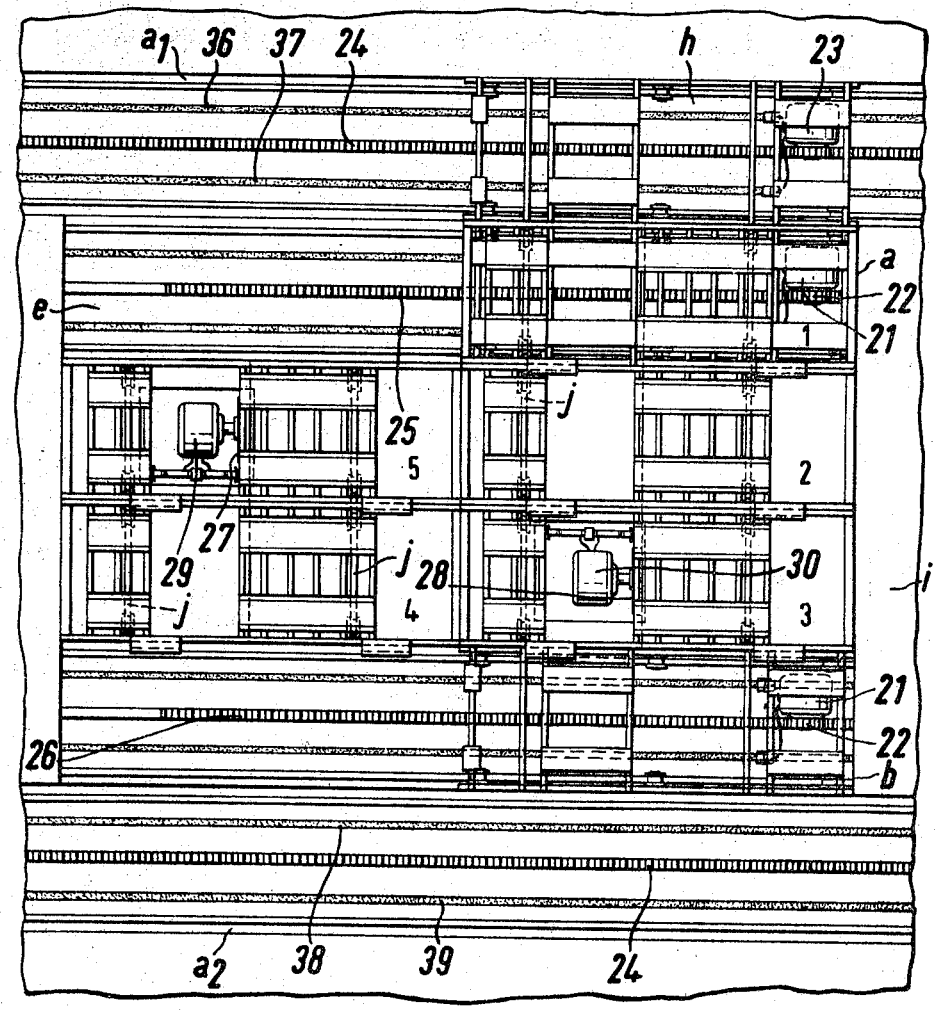
FIG. 11 is a plan view of a five pallet storage unit illustrating the drive means for the pallets, the shuttle carriers and the express carriers.
Figure 10:
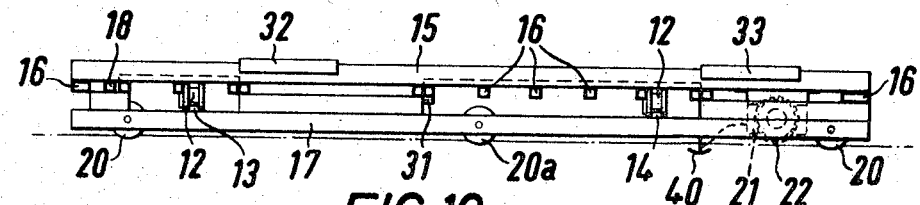
FIG. 10 is a side elevational view of a carrier member with pallet located thereon.

Reverting to FIG. 11, the drive means for the pallets comprise electric motors 29, 30, having respective pinions 27, 28, arranged to mesh with racks 31 on the pallets. The shuttle carriers $a$, $b$, are each provided with electric motors 21 arranged to drive pinions 22 in mesh with stationary racks 25, 26, as previously described. Similarly, express carriers $h$ are provided with electric motors 23 arranged to drive respective pinions in engagement with racks 24 in expressways $a_1$, $a_2$. The power for the electric motors on the shuttle carriers and express carriers is derived from live rails 36, 37; 38, 39; the current being picked up by contactors 40 (FIG. 10) depending from the carriers and supplied to the windings of the motors. Suitable braking devices carried by the express carriers may be used to control the speed thereof such that the carriers come to rest opposite an exit point, and such braking devices may, if required, be responsive to a signal picked up from the live rails, or to coded currents of different frequencies picked up from sections of the rail, or to any other means, such as to control the braking of the express carriers to a halt.

It will be appreciated that although electrical drive means have been particularly described for driving the pallets, shuttle carriers and express carriers, any form of prime mover or drive means may be used and such drive means may be operated hydraulically, by compressed air or by electromagnetic, electromechanical or mechanical or other means. Furthermore, where it may be uneconomic or inconvenient to use drive means of any kind, or in the event of failure of the drive means or power supply therefor, the movement of the pallets, shuttle carriers and express carriers may be effected manually.

The entire storage system operates in a sequential, reiterative manner or rhythm such that the storage of the vehicles can be controlled by a computer programmed to respond to electrical signals produced, for example, in response to the sensing of data recorded magnetically or otherwise on a ticket or token, such as to locate any particular storage location in any selected storage unit of the system. Alternatively, the storage system may be manually controlled or controlled by the actuation of electromagnetic relays or the like.

At any one of the expressway reception points, a ticket issuing unit may be situated; each ticket having automatically recorded or printed thereon data indicative of the time of entry, the pallet member, the expressway number, the storage location in which a vehicle is to be stored, and any other relevant date. Means may be provided such as a contact mat, bar or the like to register electrically, or by any other means, the arrival and presence of a vehicle at a reception point and this may be used to operate the ticket issuing mechanism or any safety mechanism if necessary in order to avoid the possibility of a driver, or the occupants of a vehicle being transported to a storage location or to prevent a vehicle loaded on to a pallet being moved in any way before an occupant of the vehicle is completely clear. The initiation of a "transfer to storage" operation may be effected either by the driver or other occupant of the vehicle actuating a control member such as a push-button, or alternatively, or in addition thereto a time delay device may be installed to transport the vehicle to a selected storage location after a predetermined time delay. When an express carrier with pallet thereon enters a vehicle loading bay of the system, a stop member at the end of a pallet is actuated by any suitable means and serves to impede a vehicle driven on to the pallet. A further stop member is arranged to be actuated when the vehicle is in position in order to inhibit the vehicle from moving.

As previously indicated the express carriers $h$ may be driven electrically or by any other suitable means and in an alternative embodiment, the expressway carriers $h$ are hauled or pushed by separate power-operated bogies (not shown) each linked to its respective carrier $h$ by a coupling similar to that previously described for coupling the pallets where direct power for the drive is not available. However, in this alternative embodiment the couplings provided on the express carriers consist of lateral channels such as to cooperate with complementary-shaped coupling members on the ends of the bogies. Alternatively, the bogies may be coupled to the ends of the pallets mounted on the express carriers.

Whilst it is a comparatively simple matter to provide bogies or the like to push or pull carriers carrying pallets along an expressway, some means must be provided to accommodate the bogie when it is required to remove a vehicle from the carrier.

Figure 5:
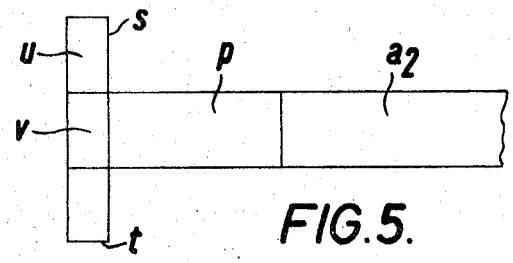
FIG. 5 is a diagrammatic illustration of an arrangement for effecting transportation of pallets carrying vehicles along the expressways by means of carrier members hauled by bogies.

Thus, if the express carriers are arranged to be pushed or hauled by bogies, as shown in FIG. 5, at the exit end of each expressway, a lower level floor or well $s$ is constructed which is preferably of a width equivalent to the width of three carriers. The floor of the well $s$ is in the form of a track extending at right angles to the expressway and having located thereon a bogie carrier (not shown) preferably identical in form and construction with the carriers $a$, $b$, previously described, and having lateral coupling means located at the ends thereof also as previously described.

Linked to the bogie carrier is a cover carrier (not shown) by means of a similar coupling arrangement and arranged to support a cover $t$. Adjacent the bogie carrier is a space or well $u$ for the bogie $v$.

If it is assumed that a pallet $p$ is located on a carrier $h$ on the expressway $a_2$ (FIG. 2) and that the bogie $v$ is supported by the bogie carrier (not shown), which is a power-driven unit, preferably under the control of a computer of like control unit, then when the bogie $v$ is driven into the well $u$, it is automatically coupled to the cover carrier (not shown). The bogie carrier is then power-driven in a transverse direction into the well $u$ for the bogie $v$ and hauls the cover carrier with it. The cover $t$ on the cover carrier is now located in the path of the express carrier $h$ in the expressway $a_2$ and the vehicle on the pallet $p$ can be driven off the cover $w$ at the exit point.

When the pallet $p$ on the express carrier $h$ is empty, the bogie $v$ is driven back to its original position, as shown in FIG. 5, immediately in the path of the express carrier $h$, to which it becomes automatically coupled. Simultaneously, the cover carrier returns to its original position, and the bogie $v$ can then drive the express carrier $h$ to a position opposite any particular storage unit required.

If it is assumed that a pallet measures $7' \times 19'$, the following calculations illustrate the time required to place a vehicle into a storage location of a storage unit or retrieve the vehicle therefrom. The two shuttle carriers $a$, $b$, always move transversely from one row of storage locations to the other simultaneously in either direction and thus move one pallet length i.e. 19'. The pallets in each row move in one longitudinal direction or the other by one storage location at a time i.e., a distance equivalent to a pallet width of 7 feet. The pallets 1 to 5 and shuttle carriers $a$, $b$, are assumed to move at a relatively slow speed of 4 feet/second. As shown in FIG. 4, a complete cycle involves twenty separate steps i.e. ten transverse movements and ten longitudinal movements.

The total distance travelled by pallets and carriers during one complete cycle is:

| | |
|---|---:|
| 10x19' (transverse), feet | 190 |
| 10x7' (longitudinal), feet | 70 |
| Total distance, feet | 260 |

Thus, the time taken to complete one cycle of operations at 4 ft./second is $\frac{260}{4} = 65$ seconds.

However, it will be appreciated that the above calculations indicate the time required to perform the twenty sequential steps required to complete a full cycle of operations, and not the time required to completely evacuate all five pallets from a storage unit. Vehicles on the five pallets may be removed in nine sequential steps involving a total travel distance of 91 feet, and thus, the total time required to place all five pallets with vehicles on to an expressway would be 22.75 second. This presupposes that a storage unit is cleared in a particular sequence, and if a different sequence is performed, the times may be greater, but the above calculations give an indication of the time required to remove vehicles from storage or place vehicles in a selected storage location of a storage unit.

| | |
|---|---:|
| Time from furthest point to express carrier, seconds | 29.5 |
| Time from express carrier to hoist, seconds | 22.5 |
| Movement of bogie and cover i.e. $7' \div 4$ seconds | 1.75 |
| Time in hoist, seconds | 3.0 |
| Total, seconds | 56.75 |

Thus, it will be seen that the maximum time required to remove any vehicle from storage would be less than 1 minute.

As with the single storey unit, the whole system is capable of control by computer means. Any ticket or token issued for a multistorey unit would have additional information recorded thereon relating to the particular floor where a vehicle is stored or required to be stored.

It will be seen from the foregoing that with the storage blocks of the present invention, it is possible to build any size of parking and storage unit required. It will be appreciated that the invention is susceptible of considerable modification and is not to be deemed limited to the particular constructional features described by way of example only. For instance, pallet identification means may be provided such that the appropriate data may be recorded on a ticket or the like. Each pallet may be provided with distinctive identification means such as male projections, terminals or contacts adapted to engage or cooperate with complementary female portions or the like provided at the entrance of each expressway. Thus, whenever a pallet is removed from storage and transported to the entrance of the expressway after delivery of a vehicle to the exit point thereof, the cooperation of the male and female members, or contacts may be arranged to produce a distinctive signal or coded signal such that data indicative of the particular pallet may be recorded on the ticket or stored in the memory of the computer or other control system.

Furthermore, although embodiments have been described in which each storage unit is accessible from at least one side via one or a pair of expressways, it will be appreciated that the expressways may be dispensed with entirely and replaced by one, two, three of four vehicle routes of bays, each bay being the size of a pallet. Also, although the storage and parking of vehicles has been particularly described, the system according to the invention may be used for the storage of any kinds of goods, for filing systems, and vehicles of all kinds such as cars, tanks, aircraft etc. Also the system is applicable to the storage of goods in retail or wholesale establishments such as supermarkets where the goods may be stored in refrigerated containers or deep freeze compartments, where the goods are located in discrete storage locations and may be selected from any particular storage location as required under the control of a computer or other control means.

Figure 12:
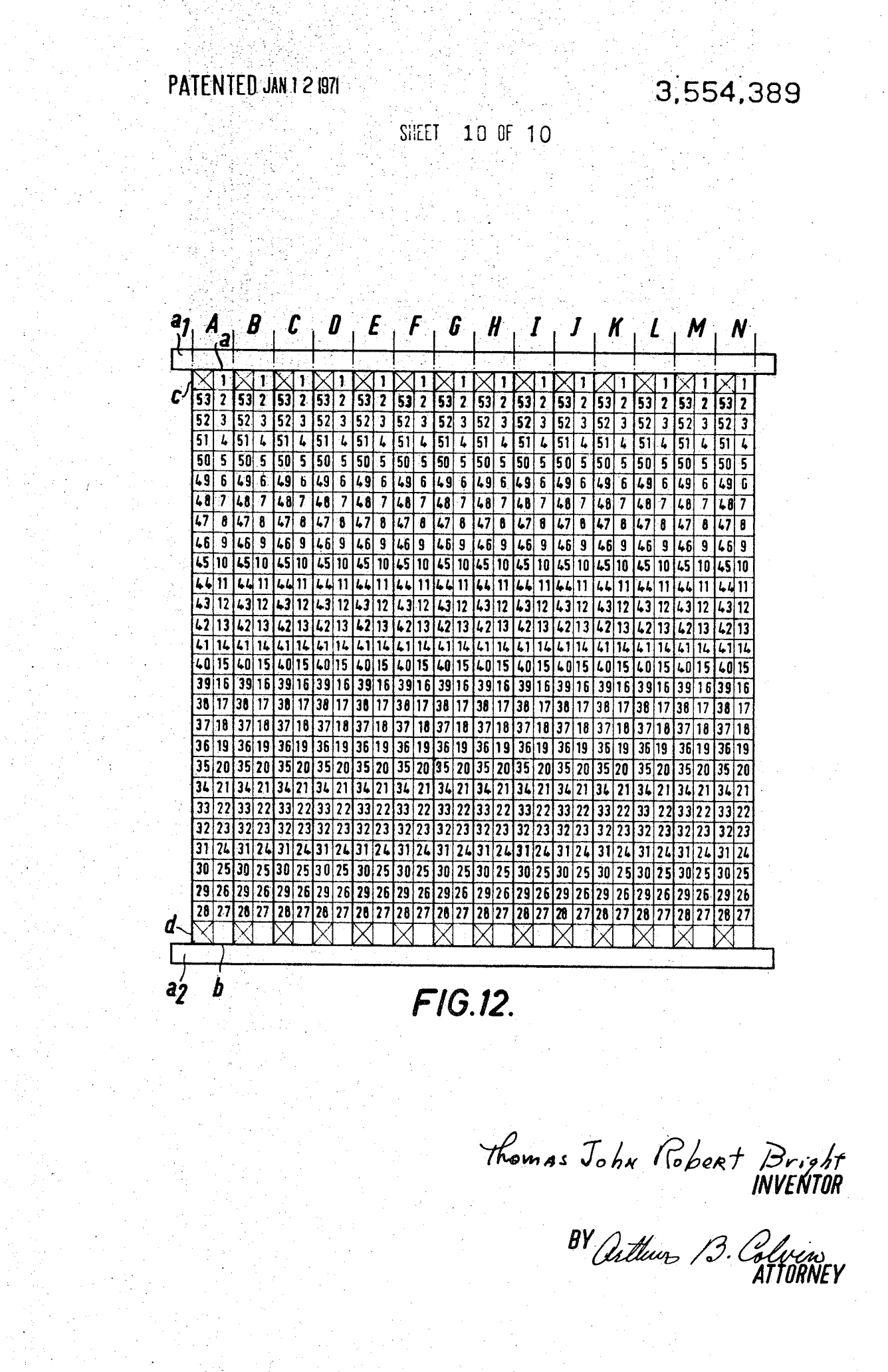

A particularly useful lay out for overnight delivery service facilities is shown diagrammatically in FIG. 12 in which the storage system includes fourteen storage units A to N each containing $N-3$ pallets, where $N = 56$, and containing also two shuttle carriers $a$, $b$, two blank spaces $c$, $d$, and wherein one or other of the shuttle carriers has a pallet located thereon whilst the other is without a pallet. The fourteen storage units A to N are located between a pair of expressways $a_1$, $a_2$ such that pallets may be inserted into, or removed from either end of each storage unit.

The arrangement of FIG. 12 has particular application to warehousing structures for the storage and handling of bulk goods, but the lay out may also be utilized for the storage of vehicles, for instance following production and whilst awaiting transit where there is not the urgency to insert a vehicle in storage or remove the same therefrom as there is with a car-parking system. The pallets may be of flat platform construction such as to receive containers or pallets from fork-lift trucks or any other form of mechanized handling device. Alternatively, the pallets of each storage unit may be of open boxlike construction or may be refrigerated containers or the like. The pallets may be of any suitable size and the shuttle and express carriers may be of corresponding size and construction. The cycle of operations involving the sequential stepping of the pallets around the rectangular area in conjunction with the reciprocation of the shuttle carriers is performed in identical manner to the sequential stepping of the five and seven pallet units previously described.

The whole operation may be controlled by a data processing unit such as a computer and the full pallets would be arranged to be processed by the computer to be adjacent one or other of the expressways. The optimum arrangement of the pallets in any storage unit could be effected during the night such that any pallets required the next morning would be readily available adjacent the expressways for rapid dispatch therealong.

Since the system according to the invention is in effect formed from a plurality of interlinked discrete integers constituting building blocks, the system lends itself particularly to control by any required means i.e. manually, automatically or by means of a computer and in the latter arrangement it is merely necessary to provide data indicative of the storage locations, and the pallets, and to correlate this data with that indicative of the arrival of a vehicle on a pallet, the time of arrival and the period of storage of the vehicle in order to produce data indicative of the charge for storage. Any automatic fare collection means may be provided at an exit point to collect any such charge and any type of automatic ticket sensing device may be installed at the entrance points to provide input data for the computer.

I claim:

1. A load storage and retrieval system including at least one load transporting route, at least one load storage unit, the or each unit having N storage locations formed within a rectangular area accessible from at least one of said load transporting route, N being a whole integer greater than 3, and N−3 movable load supporting members, said area containing in addition two movable carrier members and two of said N locations when the unit is filled being devoid of load supporting members or carrier members, said load supporting members being arranged in two parallel rows, means including track means for circulating said load supporting members in a step-by-step sequential manner around the area and movable in a direction parallel to one axis of the unit, and movable in a direction normal to said axis on a carrier member, each of said carrier members being reciprocable along a respective track extending in a direction normal to said one axis at each end of the rectangular area, each of said carrier members being reciprocable simultaneously in the same direction along said respective track means by a distance substantially equivalent to the width of a row of storage locations, so as to be aligned alternately with said parallel rows of load supporting members, the arrangement being such that the transfer of a load carried by any load supporting member, to or from said at least one load transporting route, respectively from or to a selected storage location is effected by circulatory movement of the load supporting members in conjunction with reciprocatory movement of the carrier members, the or each transporting route including a further carrier member having guide members thereon for receiving or transferring a load or a vehicle supporting member from or to a carrier member of said storage unit.

2. A storage and retrieval system as claimed in claim 1 wherein at every sequential step, one or other of said carrier members has a load or vehicle supporting member supported thereby whilst the other carrier member has no load or vehicle supporting member thereon.

3. A storage and retrieval system as claimed in claim 1 wherein drive means are provided for said carrier members and load supporting members to effect circulation thereof around said area, and separate drive means for said further carrier members, the latter being driven at a higher speed than the circulation speed of said carrier members and load supporting members.

4. A storage and retrieval system as claimed in claim 1 wherein said load or vehicle supporting members each comprise a pallet having wheels arranged to run on transverse rails located on said carrier members and longitudinal rails within said rectangular area, and said carrier members having wheels rotatable about axes substantially normal to the axes of rotation of the wheels on said pallets and arranged to run on rails extending transversely within the rectangular area.

5. A storage and retrieval system as claimed in claim 1 wherein each load supporting member has a coupling member located along each longitudinal edge thereof arranged to interlockingly engage with a complementary shaped coupling member along the longitudinal edge of an adjacent load supporting member, the arrangement being such that the load supporting members in any row are coupled together for movement in a longitudinal direction of the rectangular area and uncoupled from the remaining load supporting members of a row and recoupled to a load supporting member of an adjacent row when movement in a transverse direction of the area on a carrier member occurs.

6. A storage and retrieval system as claimed in claim 1 wherein the coupling members are arranged such as to allow a load or vehicle supporting member on a further carrier member to become uncoupled from a load supporting member on a carrier member when said further carrier member is driven along a load or vehicle transporting route.

7. A storage and retrieval system as claimed in claim 1 wherein each carrier member is provided with a stop means to prevent a load or vehicle supporting member from overrunning the sides of a carrier member on which it is located, and camming means on said further carrier members arranged to engage with tripping means on said stop means such as to remove the stop means from the path of a load or vehicle supporting member and allow the latter to be off-loaded from the carrier member on to said further carrier member.

8. A storage and retrieval system as claimed in claim 3 wherein a stationary electric motor is provided for each row of load or vehicle supporting members each arranged to drive pinions meshing with racks located underneath the load or vehicle supporting members, the reciprocatory carrier members having separate electric motors mounted thereon arranged to drive pinions meshing with racks extending transversely of said rectangular area and said further carrier members having separate electric motors mounted thereon arranged to drive pinions meshing with racks extending along said load or vehicle transporting routes.

9. A storage and retrieval system as claimed in claim 8 wherein electric current conducting rails are provided for the electric motors of the reciprocable carrier members and further carrier members to provide excitation for the windings thereof.

10. A storage and retrieval system as claimed in claim 1 wherein drive means are provided for said carrier members and load supporting member to effect the circulatory movement thereof around the rectangular area, and separate drive means for said further carrier members.

11. A storage and retrieval system as claimed in claim 10 wherein said drive means and separate drive means are hydraulically operable.

12. A storage and retrieval system as claimed in claim 10 wherein said drive means and separate drive means are operated by mechanical means or by compressed air.

13. A storage and retrieval system as claimed in claim 1 wherein the load supporting members or carrier members or further carrier members are operated manually.

14. A vehicle storage and retrieval system including at least one vehicle storage unit, two transporting routes, said routes being disposed in a transverse direction relative to said parallel rows of storage locations, the or each unit having two parallel rows of storage locations within a rectangular area each accessible from at least one of said vehicle transporting route, all but three of the storage locations being provided with vehicle supporting pallets arranged to move in a longitudinal direction along the rows, means for moving said pallets along said rows, said area containing two pallet carrier members arranged to move in a transverse direction between the rows and having guide means located thereon for alignment of the pallets carried thereby with a selected one of said rows, and two of said storage locations being devoid of pallets when the unit is filled with said pallet carrier members and means for moving said pallets along said rows being operative to circulate said pallets around the area in step-by-step sequential manner whereby to present each pallet in turn to said at least one vehicle transporting route for the removal of a vehicle from or the storage of vehicles in, a selected location of a storage unit, pallet carrier means located in each of said transporting routes, and means on said pallet carrier means to transfer a pallet to or from said pallet carrier members.